(12) United States Patent
Zhang et al.

(10) Patent No.: US 12,015,570 B2
(45) Date of Patent: Jun. 18, 2024

(54) CHANNEL OR SIGNAL SENDING METHOD AND APPARATUS, AND STORAGE MEDIUM

(71) Applicant: ZTE Corporation, Shenzhen (CN)

(72) Inventors: Chenchen Zhang, Shenzhen (CN); Yu Ngok Li, Shenzhen (CN); Peng Hao, Shenzhen (CN); Xingguang Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 346 days.

(21) Appl. No.: 17/434,433

(22) PCT Filed: Feb. 28, 2020

(86) PCT No.: PCT/CN2020/077210
§ 371 (c)(1),
(2) Date: Aug. 27, 2021

(87) PCT Pub. No.: WO2020/177630
PCT Pub. Date: Sep. 10, 2020

(65) Prior Publication Data
US 2022/0150005 A1 May 12, 2022

(30) Foreign Application Priority Data
Mar. 1, 2019 (CN) .......................... 201910157348.4

(51) Int. Cl.
*H04L 5/00* (2006.01)
*H04W 52/14* (2009.01)
*H04W 52/24* (2009.01)

(52) U.S. Cl.
CPC .......... *H04L 5/0032* (2013.01); *H04L 5/0051* (2013.01); *H04W 52/146* (2013.01); *H04W 52/243* (2013.01)

(58) Field of Classification Search
CPC .. H04L 5/0032; H04L 5/0051; H04W 52/146; H04W 52/243; H04W 52/281;
(Continued)

(56) References Cited

U.S. PATENT DOCUMENTS

2013/0322378 A1 12/2013 Guan
2014/0192738 A1 7/2014 Nam
(Continued)

FOREIGN PATENT DOCUMENTS

CN 104427604 A 3/2015
CN 106416387 A 2/2017
(Continued)

OTHER PUBLICATIONS

3rd Generation Partnership Project; Technical Specification Group Radio Access Network; NR; Physical layer procedures for control, 3GPP TS 38.213 V15.4.0 (Dec. 2018). (Year: 2018).*
(Continued)

*Primary Examiner* — Shailendra Kumar
(74) *Attorney, Agent, or Firm* — CANTOR COLBURN LLP

(57) ABSTRACT

Provided are a channel or signal sending method and apparatus, and a storage medium. The method includes: if a transmission direction configuration of the first carrier or the first carrier group indicates that an uplink transmission is sent within the transmission time of the first transmission, sending, by a terminal, the first transmission, and canceling the sending of the second transmission or sending the second transmission with reduced power; otherwise, performing, by a terminal, at least one of the following modes: sending the first transmission, and canceling the sending of the second transmission or sending the second transmission with reduced power; sending the second transmission, and canceling the sending of the first transmission or sending the
(Continued)

Schedule a first transmission sent on a first carrier or a first carrier group, and schedule a second transmission sent on a second carrier or a second carrier group, where transmission time of the first transmission overlaps transmission time of the second transmission; if a transmission direction configuration of the first carrier or the first carrier group indicates that an uplink transmission is able to be sent within the transmission time of the first transmission, a terminal sends the first transmission, and the sending of the second transmission is canceled or the second transmission is sent with reduced power; and/or if a transmission direction configuration of the first carrier or the first carrier group does not indicate that an uplink transmission is able to be sent within the transmission time of the first transmission, then a terminal performs at least one of the following modes: 1) sending the first transmission, and canceling the sending of the second transmission or sending the second transmission with reduced power; 2) sending the second transmission, and canceling the sending of the first transmission or sending the first transmission with reduced power; 3) determining, by the terminal, whether to send the first transmission or the second transmission; 4) determining, according to high layer signaling 1 configured by a base station, whether to send the first transmission or the second transmission; or 5) determining, according to a transmission type of the first transmission, a transmission type of the second transmission, and rule 1 configured by a base station, whether to send the first transmission or the second transmission ⟋ S102 first transmission with reduced power; determining whether to send the first transmission or the second transmission by the terminal itself.

20 Claims, 2 Drawing Sheets

(58) Field of Classification Search
CPC . H04W 72/0453; H04W 76/15; H04W 76/16; H04W 52/346; H04W 52/367; H04W 72/23; H04W 72/563; H04W 72/56; H04W 72/569
See application file for complete search history.

(56) References Cited

U.S. PATENT DOCUMENTS

| | | | |
|---|---|---|---|
| 2016/0044606 | A1 | 2/2016 | Yin |
| 2019/0223115 | A1* | 7/2019 | Chen .................. H04W 72/044 |
| 2020/0229103 | A1* | 7/2020 | Hosseini .............. H04L 5/0055 |
| 2020/0359402 | A1* | 11/2020 | Xing ................. H04W 72/0453 |

FOREIGN PATENT DOCUMENTS

| | | |
|---|---|---|
| CN | 107113740 A | 8/2017 |
| CN | 109151978 A | 1/2019 |
| CN | 109152030 A | 1/2019 |
| CN | 109392176 A | 2/2019 |
| KR | 20180134870 A | 12/2018 |
| WO | 2018199691 A1 | 11/2018 |
| WO | 2020146761 A1 | 7/2020 |

OTHER PUBLICATIONS

3rd Generation Partnership Project; Technical Specification Group Radio Access Network; Evolved Universal Terrestrial Radio Access (E-UTRA); Physical layer procedures, 3GPP TS 36.213 V14.9.0 (Dec. 2018) (Year: 2018).*
3GPP TS 38.213 Technical Specification Group Radio Access Network; NR Physical layer procedures for control, Jan. 14, 2019, XP051575590.
European Search Report for corresponding application EP 20 76 6161; dated Oct. 25, 2022.
Korean Office Action for corresponding application 10-2021-7031266; Report dated Apr. 27, 2023.
Chinese Office Action for corresponding application 201910157348.4; Report dated Jul. 21, 2022.
Chinese Search Report for corresponding application 201910157348.4; Report dated Jul. 14, 2022.
International Search Report for corresponding application PCT/CN2020/077210 filed Feb. 28, 2020; dated May 20, 2020.
InterDigital, Inc, "Power Control for NE-DC Option 4/4A", 3GPP TSG RAN WG1 RAN1#93, Busan, Korea, May 21-25, 2018, R1-1806965.
Huawei, HiSilicon, "Remaining issues on LTE-NR coexistence", 3GPP TSG RAN WG1 Meeting #94bis, Chengdu, China, Oct. 8-12, 2018, R1-1810114.

* cited by examiner

Schedule a first transmission sent on a first carrier or a first carrier group, and schedule a second transmission sent on a second carrier or a second carrier group, where transmission time of the first transmission overlaps transmission time of the second transmission; if a transmission direction configuration of the first carrier or the first carrier group indicates that an uplink transmission is able to be sent within the transmission time of the first transmission, a terminal sends the first transmission, and the sending of the second transmission is canceled or the second transmission is sent with reduced power; and/or if a transmission direction configuration of the first carrier or the first carrier group does not indicate that an uplink transmission is able to be sent within the transmission time of the first transmission, then a terminal performs at least one of the following modes: 1) sending the first transmission, and canceling the sending of the second transmission or sending the second transmission with reduced power; 2) sending the second transmission, and canceling the sending of the first transmission or sending the first transmission with reduced power; 3) determining, by the terminal, whether to send the first transmission or the second transmission; 4) determining, according to high layer signaling 1 configured by a base station, whether to send the first transmission or the second transmission; or 5) determining, according to a transmission type of the first transmission, a transmission type of the second transmission, and rule 1 configured by a base station, whether to send the first transmission or the second transmission ⟋ S102

FIG. 1

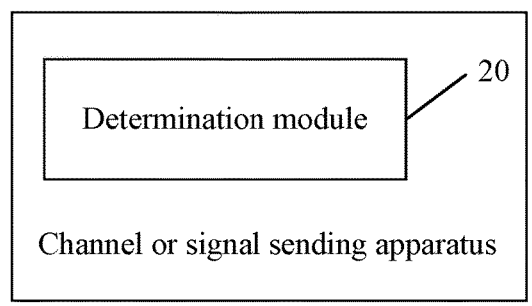

FIG. 2

CHANNEL OR SIGNAL SENDING METHOD AND APPARATUS, AND STORAGE MEDIUM

This application claims priority to Chinese Patent Application No. 201910157348.4 filed with the China National Intellectual Property Administration (CNIPA) on Mar. 1, 2019, the disclosure of which is incorporated herein by reference in its entirety.

TECHNICAL FIELD

The present disclosure relates to the field of communications, for example, a channel or signal sending method and apparatus, and a storage medium.

BACKGROUND

To support the coexistence of long-term evolution (LTE) and new radio (NR), a dual connection (DC) mode is used. Specifically, the DC mode includes EN-DC where LTE is used in a master cell group (MCG) and NR is used in a secondary cell group (SCG) and NE-DC where NR is used in the MCG and LTE is used in the SCG. E denotes evolved-universal terrestrial radio access (E-UTRA), that is, the 4th generation mobile communication system (4G) radio access network. N denotes NR, that is, the 5G new radio. Next generation (NG) denotes the next generation core network, that is, the 5G core network. EN-DC refers to a dual connection between the 5GNR and the 4G radio access network. NE-DC refers to a dual connection between the 5GNR and the 4G radio access network under the 5G core network. Additionally, NN-DC is also supported in an NR system, that is, NR is used in both the MCG and the SCG.

In NR R15, priorities of various uplink transmission channels or signals in a carrier aggregation (CA) scenario are discussed. When a user equipment (UE) needs to send multiple uplink transmission channels or signals completely or partially overlapping in time domain resources, if the total uplink transmit power of the UE cannot meet the requirements of all uplink transmission channels or signals, the UE needs to allocate the limited uplink transmit power firstly to an uplink transmission channel or signal with a high priority according to the prioritization. The prioritization rule given in NR R15 is described below.

Within a cell group (CG) (the MCG or the SCG), the prioritization includes as follows.

A physical random access channel (PRACH) on a primary cell>a physical uplink control channel (PUCCH) with hybrid automatic repeat request-acknowledgement (HARQ-ACK)/scheduling request (SR)=a physical uplink shared channel (PUSCH) with HARQ-ACK>a PUCCH with channel state information (CSI)=a PUSCH with CSI>a PUSCH without uplink control information (UCI)>an aperiodic sounding reference signal (A-SRS)>a persistent-/semi-SRS (P/SP-SRS)=a PRACH on the secondary cell.

For uplink transmission channels or signals of the same type, a transmission sent on a primary cell has a higher priority than a transmission sent on a secondary cell within the CG (the MCG or the SCG).

For uplink transmission channels or signals of the same type, a transmission sent on a primary cell within the MCG has a higher priority than a transmission sent on a primary cell within the SCG.

Based on the preceding prioritization rule, the UE may decide the allocation of the uplink power among multiple uplink transmission channels or signals.

For EN-DC, NE-DC, NN-DC or CA, when multiple carriers have downlink or uplink transmission requirements, if the sending time of these transmissions completely or partially overlaps, for uplink transmissions, as limited by the transmit power of a terminal, multiple overlapping uplink transmissions cannot be ensured to be sent according to the required power; and for downlink transmissions, in view of interference between the multiple transmissions, it cannot be ensured that a terminal may well demodulate multiple overlapping downlink transmissions.

SUMMARY

Embodiments of the present disclosure provide a channel or signal sending method and apparatus, and a storage medium, so as to solve at least the problem of how to transmit multiple transmission channels or signals when sending of multiple transmissions overlapping in time domain resources cannot be ensured in downlink or uplink in the related art.

An embodiment of the present disclosure provides a channel or signal sending method. The method includes steps described below: a first transmission sent on a first carrier or a first carrier group is scheduled, and a second transmission sent on a second carrier or a second carrier group is scheduled, where transmission time of the first transmission overlaps transmission time of the second transmission; if a transmission direction configuration of the first carrier or the first carrier group indicates that an uplink transmission is able to be sent within the transmission time of the first transmission, a terminal sends the first transmission, and cancels the sending of the second transmission or sends the second transmission with reduced power; and/or if a transmission direction configuration of the first carrier or the first carrier group does not indicate that an uplink transmission is able to be sent within the transmission time of the first transmission, a terminal performs at least one of the following modes: sending the first transmission, and canceling the sending of the second transmission or sending the second transmission with reduced power; sending the second transmission, and canceling the sending of the first transmission or sending the first transmission with reduced power; determining whether to send the first transmission or the second transmission by itself; determining, according to high layer signaling 1 configured by a base station, whether to send the first transmission or the second transmission; or determining, according to a transmission type of the first transmission, a transmission type of the second transmission, and rule 1 configured by a base station, whether to send the first transmission or the second transmission.

Another embodiment of the present disclosure further provides a channel or signal sending apparatus. The apparatus is applied to a terminal and includes a determination module. The determination module is configured to schedule a first transmission sent on a first carrier or a first carrier group, and schedule a second transmission sent on a second carrier or a second carrier group, where transmission time of the first transmission overlaps transmission time of the second transmission. If a transmission direction configuration of the first carrier or the first carrier group indicates that an uplink transmission is able to be sent within the transmission time of the first transmission, a terminal sends the first transmission, and cancels the sending of the second transmission or sends the second transmission with reduced power; and/or if a transmission direction configuration of the first carrier or the first carrier group does not indicate that an uplink transmission is able to be sent within the transmission time of the first transmission, a terminal performs at least one of the following modes: sending the first transmission, and canceling the sending of the second transmission or sending the second transmission with reduced power; sending the second transmission, and canceling the sending of the first transmission or sending the first transmission with reduced power; determining whether to send the first transmission or the second transmission by itself; determining, according to high layer signaling 1 configured by a base station, whether to send the first transmission or the second transmission; or determining, according to a transmission type of the first transmission, a transmission type of the second transmission, and rule 1 configured by a base station, whether to send the first transmission or the second transmission.

Another embodiment of the present disclosure further provides a storage medium. The storage medium is configured to store a computer program. The computer program is configured to, when executed, implement any channel or signal sending method described above.

According to the present disclosure, a first transmission sent on a first carrier or a first carrier group is scheduled, and a second transmission sent on a second carrier or a second carrier group is scheduled, where transmission time of the first transmission overlaps transmission time of the second transmission; if a transmission direction configuration of the first carrier or the first carrier group indicates that an uplink transmission can be sent within the transmission time of the first transmission, then a terminal sends the first transmission, and the sending of the second transmission is canceled or the second transmission is sent with reduced power; and/or if a transmission direction configuration of the first carrier or the first carrier group does not indicate that an uplink transmission can be sent within the transmission time of the first transmission, a terminal performs at least one of the following modes: sending the first transmission, and canceling the sending of the second transmission or sending the second transmission with reduced power; sending the second transmission, and canceling the sending of the first transmission or sending the first transmission with reduced power; determining, by the terminal, whether to send the first transmission or the second transmission; determining, according to high layer signaling 1 configured by a base station, whether to send the first transmission or the second transmission; or determining, according to a transmission type of the first transmission, a transmission type of the second transmission, and rule 1 configured by a base station, whether to send the first transmission or the second transmission. The preceding scheme solves the problem of how to transmit multiple transmission channels or signals when the sending of multiple transmissions overlapping in time domain resources cannot be ensured in downlink or uplink in the related art.

BRIEF DESCRIPTION OF DRAWINGS

FIG. 1 is a flowchart of a channel or signal sending method according to an embodiment of the present disclosure;

FIG. 2 is a block diagram of a channel or signal sending apparatus according to an embodiment of the present disclosure;

DETAILED DESCRIPTION

Figure 3:
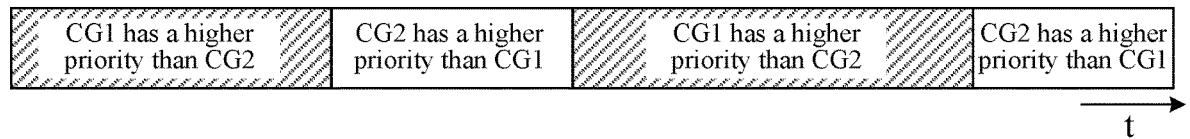
FIG. 3 is a schematic diagram of a priority time domain pattern of two CGs according to alternative embodiments four and five of the present disclosure.

The present disclosure is hereinafter described in detail with reference to drawings in conjunction with embodiments.

It is to be noted that the terms "first", "second" and the like described herein are used to distinguish between similar objects and are not necessarily used to describe a particular order or sequence.

Embodiments of the present disclosure are mainly about the method for determining the priorities of multiple transmissions for in EN-DC, NE-DC, NN-DC or CA so as to prioritize certain transmissions and implement single transmit (single Tx), or some transmissions are sent with reduced power.

Embodiment One

An embodiment of the present disclosure provides a channel or signal sending method. FIG. 1 is a flowchart of a channel or signal sending method according to an embodiment of the present disclosure. As shown in FIG. 1, the method includes the steps below.

In step S102, a first transmission sent on a first carrier or a first carrier group is scheduled, and a second transmission sent on a second carrier or a second carrier group is scheduled. Transmission time of the first transmission overlaps transmission time of the second transmission; if a transmission direction configuration of the first carrier or the first carrier group indicates that an uplink transmission is able to be sent within the transmission time of the first transmission, a terminal sends the first transmission, and the sending of the second transmission is canceled or the second transmission is sent with reduced power; and/or if a transmission direction configuration of the first carrier or the first carrier group does not indicate that an uplink transmission is able to be sent within the transmission time of the first transmission, a terminal performs at least one of the following modes: 1) sending the first transmission, and canceling the sending of the second transmission or sending the second transmission with reduced power; 2) sending the second transmission, and canceling the sending of the first transmission or sending the first transmission with reduced power; 3) determining whether to send the first transmission or the second transmission by itself; 4) determining, according to high layer signaling 1 configured by a base station, whether to send the first transmission or the second transmission; or 5) determining, according to a transmission type of the first transmission, a transmission type of the second transmission, and rule 1 configured by a base station, whether to send the first transmission or the second transmission.

According to the present disclosure, a first transmission sent on a first carrier or a first carrier group is scheduled, and a second transmission sent on a second carrier or a second carrier group is scheduled, where transmission time of the first transmission overlaps transmission time of the second transmission; if a transmission direction configuration of the first carrier or the first carrier group indicates that an uplink transmission can be sent within the transmission time of the first transmission, then a terminal sends the first transmission, and the sending of the second transmission is canceled or the second transmission is sent with reduced power;

and/or if a transmission direction configuration of the first carrier or the first carrier group does not indicate that an uplink transmission can be sent within the transmission time of the first transmission, a terminal performs at least one of the following modes: 1) sending the first transmission, and canceling the sending of the second transmission or sending the second transmission with reduced power; 2) sending the second transmission, and canceling the sending of the first transmission or sending the first transmission with reduced power; 3) determining, by the terminal, whether to send the first transmission or the second transmission; 4) determining, according to high layer signaling 1 configured by a base station, whether to send the first transmission or the second transmission; or 5) determining, according to a transmission type of the first transmission, a transmission type of the second transmission, and rule 1 configured by a base station, whether to send the first transmission or the second transmission. The preceding scheme solves the problem of how to determine the priorities of multiple transmission channels or signals when the sending of multiple transmissions overlapping in time domain resources cannot be ensured in downlink or uplink in the related art.

In an embodiment of the present disclosure, the high layer signaling 1 is for the base station to instruct the terminal to perform at least one of the following operations: sending the first transmission and canceling sending of the second transmission; sending the second transmission and canceling sending of the first transmission; sending the first transmission and sending the second transmission with reduced power; or sending the second transmission and sending the first transmission with reduced power.

In an embodiment of the present disclosure, the rule 1 refers to that when the base station configures for the terminal that the first transmission is of transmission type 1 and the second transmission is of transmission type 2, the terminal performs at least one of the following operations: sending the first transmission and canceling the sending of the second transmission; sending the second transmission and canceling sending of the first transmission; sending the first transmission and sending the second transmission with reduced power; or sending the second transmission and sending the first transmission with reduced power.

In an embodiment of the present disclosure, the transmission type includes at least one of the followings: a PUCCH, a PUSCH, a PUSCH for multiplexing designated UCI, a PUSCH without multiplexing UCI, a PUCCH containing designated UCI, a PRACH, a sounding reference signal (SRS), a demodulation reference signal (DMRS), an ultra reliable and low latency communication (URLLC) PUCCH, a URLLC PUSCH, a URLLC PRACH, a URLLC SRS, a URLLC DMRS, an enhanced mobile broadband (eMBB) PUCCH, an eMBB PUSCH, an eMBB PRACH, an eMBB SRS or an eMBB DMRS.

In an embodiment of the present disclosure, the first carrier is an LTE carrier or the first carrier group is an LTE carrier group, and the second carrier an NR carrier or the second carrier group is an NR carrier group.

In an embodiment of the present disclosure, the method further includes the step below.

The terminal determines a priority of a transmission channel or signal according to at least one of the following pieces of information:
transmission time of the transmission channel or signal; a transmission direction configuration of a CG; whether a CG where the transmission channel or signal is located is an MCG or an SCG; whether a CG where the transmission channel or signal is located is LTE or NR; a terminal capability type; a time domain pattern of a transmission priority; a time domain pattern of an uplink power threshold; a transmission type of the transmission channel or signal; a terminal implementation mode; or a determination rule configured by the base station.

In an embodiment of the present disclosure, the method further includes at least one of the followings: the terminal sends an uplink transmission with a high priority or receives a downlink transmission with a high priority; the terminal cancels sending of an uplink transmission with a low priority or sends an uplink transmission with a low priority with reduced power; or the terminal cancels reception of a downlink transmission with a low priority or the terminal receives a downlink transmission with a low priority over a part of time-frequency resources of the transmission.

In an embodiment of the present disclosure, the method further includes the step below.

For a terminal supporting capability type 1, the terminal regards by default that the base station schedules an uplink transmission channel or signal sent on CG1, and transmission time of the uplink transmission channel or signal is a subset of time units in which the transmission direction configuration of CG1 is uplink.

In an embodiment of the present disclosure, the method further includes the step below.

For the terminal supporting capability type 1, the terminal regards by default that the base station schedules a downlink transmission channel or signal received on CG1, and transmission time of the downlink transmission channel or signal is a subset of time units in which the transmission direction configuration of CG1 is downlink. A time unit may refer to at least one of a radio frame, a subframe, a slot, a mini-subframe, a mini-slot or an orthogonal frequency division multiplexing (OFDM) symbol.

In an embodiment of the present disclosure, the method further includes the step below.

For a terminal supporting capability type 2, the terminal regards by default that the base station schedules an uplink transmission channel or signal sent on CG1, and transmission time of the uplink transmission channel or signal is an arbitrary time unit.

In an embodiment of the present disclosure, the method further includes the step below.

For the terminal supporting capability type 2, the terminal regards by default that the base station schedules a downlink transmission channel or signal received on CG1, and transmission time of the downlink transmission channel or signal is an arbitrary time unit.

In an embodiment of the present disclosure, the method further includes at least one of the followings: the terminal of capability type 1 is able to not support dynamic power allocation; or the terminal of capability type 2 is able to support dynamic power allocation or not support the dynamic power allocation.

In an embodiment of the present disclosure, the method further includes the step below.

The terminal receives a time domain pattern of a transmission priority semi-persistently configured by the base station through high layer signaling, where the time domain pattern of the transmission priority is used for indicating a prioritization of multiple CGs in several consecutive or inconsecutive time units. The terminal acquires a prioritization of CGs in one or more time units according to the received time domain pattern of the transmission priority.

In an embodiment of the present disclosure, the method further includes the step below.

The terminal receives a time domain pattern of an uplink power threshold semi-persistently configured by the base station through high layer signaling. The time domain pattern of the uplink power threshold is used for indicating which set of uplink power thresholds the terminal applies to each of several consecutive or inconsecutive time units.

To sum up, according to the scheme of the present disclosure, sending priorities of these transmissions or canceling priorities of these transmissions is determined to prioritize a downlink or uplink transmission with a high priority or cancel the sending of a downlink or uplink transmission with a low priority, thereby ensuring system performance. This application provides some methods to ensure sending the downlink or uplink transmission with a high priority or canceling the downlink or uplink transmission with a low priority.

From the description of the implementations above, those having ordinary skill in the art may know that the methods in the embodiments above may be implemented by software plus a necessary general-purpose hardware platform, or may be implemented by hardware certainly. However, in many cases, the former is a preferred implementation. Based on this understanding, the schemes provided by the present disclosure substantially, or the part contributing to the related art, may be embodied in the form of a software product. The computer software product is stored in a storage medium (such as a read-only memory (ROM)/random access memory (RAM), a magnetic disk or an optical disk), and the storage medium includes several instructions for enabling a terminal device (which may be a mobile phone, a computer, a server, a network device or the like) to perform the methods according to the various embodiments of the present disclosure.

Embodiment Two

This embodiment further provides a channel or signal sending apparatus. The apparatus is applied to a terminal and configured to implement the embodiments and alternative implementations above. What has been described is not repeated. As used below, the term "module" may implement a combination of software and/or hardware with predetermined functions. The apparatus in this embodiment below may be implemented by software, but an implementation by hardware or by a combination of software and hardware is also possible and conceived.

FIG. 2 is a block diagram of a channel or signal sending apparatus according to an embodiment of the present disclosure. As shown in FIG. 2, the apparatus includes a determination module 20.

The determination module 20 is configured to schedule a first transmission sent on a first carrier or a first carrier group, and schedule a second transmission sent on a second carrier or a second carrier group. Transmission time of the first transmission overlaps transmission time of the second transmission. If a transmission direction configuration of the first carrier or the first carrier group indicates that an uplink transmission is able to be sent within the transmission time of the first transmission, a terminal sends the first transmission, and the sending of the second transmission is canceled or the second transmission is sent with reduced power; and/or if a transmission direction configuration of the first carrier or the first carrier group does not indicate that an uplink transmission is able to be sent within the transmission time of the first transmission, a terminal performs at least one of the following modes: 1) sending the first transmission, and canceling the sending of the second transmission or sending the second transmission with reduced power; 2) sending the second transmission, and canceling the sending of the first transmission or sending the first transmission with reduced power; 3) determining whether to send the first transmission or the second transmission by the terminal itself; 4) determining whether to send the first transmission or the second transmission according to high layer signaling 1 configured by a base station; or 5) determining whether to send the first transmission or the second transmission according to a transmission type of the first transmission, a transmission type of the second transmission, and rule 1 configured by a base station.

According to the present disclosure, a first transmission sent on a first carrier or a first carrier group is scheduled, and a second transmission sent on a second carrier or a second carrier group is scheduled, where transmission time of the first transmission overlaps transmission time of the second transmission; if a transmission direction configuration of the first carrier or the first carrier group indicates that an uplink transmission is able to be sent within the transmission time of the first transmission, a terminal sends the first transmission, and the sending of the second transmission is canceled or the second transmission is sent with reduced power; and/or if a transmission direction configuration of the first carrier or the first carrier group does not indicate that an uplink transmission is able to be sent within the transmission time of the first transmission, a terminal performs at least one of the following modes: 1) sending the first transmission, and canceling the sending of the second transmission or sending the second transmission with reduced power; 2) sending the second transmission, and canceling the sending of the first transmission or sending the first transmission with reduced power; 3) determining whether to send the first transmission or the second transmission by the terminal itself; 4) determining whether to send the first transmission or the second transmission according to high layer signaling 1 configured by a base station; or 5) determining whether to send the first transmission or the second transmission according to a transmission type of the first transmission, a transmission type of the second transmission, and rule 1 configured by a base station. The preceding scheme solves the problem of how to determine the priorities of multiple transmission channels or signals when the sending of multiple transmissions overlapping in time domain resources cannot be ensured in downlink or uplink in the related art.

In an embodiment of the present disclosure, the high layer signaling 1 is for the base station to instruct the terminal to perform at least one of the following operations: sending the first transmission and canceling sending of the second transmission; sending the second transmission and canceling sending of the first transmission; sending the first transmission and sending the second transmission with reduced power; or sending the second transmission and sending the first transmission with reduced power.

In an embodiment of the present disclosure, rule 1 refers to that when the base station configures for the terminal that the first transmission is of transmission type 1 and the second transmission is of transmission type 2, the terminal performs at least one of the following operations: sending the first transmission and canceling sending of the second transmission; sending the second transmission and canceling sending of the first transmission; sending the first transmission and sending the second transmission with reduced power; or sending the second transmission and sending the first transmission with reduced power.

In an embodiment of the present disclosure, the transmission type includes at least one of the following: a PUCCH, a PUSCH, a PUSCH for multiplexing designated UCI, a PUSCH without multiplexing UCI, a PUCCH containing designated UCI, a PRACH, an SRS, a DMRS, a URLLC PUCCH, a URLLC PUSCH, a URLLC PRACH, a URLLC SRS, a URLLC DMRS, an eMBB PUCCH, an eMBB PUSCH, an eMBB PRACH, an eMBB SRS or an eMBB DMRS.

In an embodiment of the present disclosure, the first carrier is an LTE carrier or the first carrier group is an LTE carrier group, and the second carrier is an NR carrier or the second carrier group is an NR carrier group.

In an embodiment of the present disclosure, the terminal determines a priority of a transmission channel or signal according to at least one of the following pieces of information:

transmission time of the transmission channel or signal; a transmission direction configuration of a CG; whether a CG where the transmission channel or signal is located is an MCG or an SCG; whether a CG where the transmission channel or signal is located is LTE or NR; a terminal capability type; a time domain pattern of a transmission priority; a time domain pattern of an uplink power threshold; a transmission type of the transmission channel or signal; a terminal implementation mode; or a determination rule configured by the base station.

In an embodiment of the present disclosure, the terminal sends an uplink transmission with a high priority or receives a downlink transmission with a high priority; and/or, the terminal cancels sending of an uplink transmission with a low priority or sends an uplink transmission with a low priority with reduced power; and/or, the terminal cancels the reception of a downlink transmission with a low priority, or the terminal receives a downlink transmission with a low priority over a part of time-frequency resources of the transmission.

In an embodiment of the present disclosure, for a terminal supporting capability type 1, the terminal regards by default that the base station schedules an uplink transmission channel or signal sent on CG1, and transmission time of the uplink transmission channel or signal is a subset of time units in which the transmission direction configuration of CG1 is uplink.

In an embodiment of the present disclosure, for the terminal supporting capability type 1, the terminal regards by default that the base station schedules a downlink transmission channel or signal received on CG1, and transmission time of the downlink transmission channel or signal is a subset of time units in which the transmission direction configuration of CG1 is downlink. A time unit may refer to at least one of a radio frame, a subframe, a slot, a mini-subframe, a mini-slot or an OFDM symbol.

In an embodiment of the present disclosure, for a terminal supporting capability type 2, the terminal regards by default that the base station schedules an uplink transmission channel or signal sent on CG1m and transmission time of the uplink transmission channel or signal is an arbitrary time unit.

In an embodiment of the present disclosure, for the terminal supporting capability type 2, the terminal regards by default that the base station schedules a downlink transmission channel or signal received on CG1, and transmission time of the downlink transmission channel or signal is an arbitrary time unit.

In an embodiment of the present disclosure, the terminal of capability type 1 is able to not support dynamic power allocation; and the terminal of capability type 2 is able to support dynamic power allocation or not support the dynamic power allocation.

In an embodiment of the present disclosure, the terminal receives a time domain pattern of a transmission priority semi-persistently configured by the base station through high layer signaling, where the time domain pattern of the transmission priority is used for indicating a prioritization of multiple CGs in several consecutive or inconsecutive time units. The terminal acquires a prioritization of CGs in one or more time units according to the received time domain pattern of the transmission priority.

In an embodiment of the present disclosure, the terminal receives a time domain pattern of an uplink power threshold semi-persistently configured by the base station through high layer signaling. The time domain pattern of the uplink power threshold is used for indicating which set of uplink power thresholds the terminal applies to each of several consecutive or inconsecutive time units.

The scheme of embodiment one and the scheme of embodiment two above may be used in combination or separately. This is not limited in the embodiments of the present disclosure.

The preceding schemes are below in conjunction with alternative embodiments, which are not intended to limit the schemes in the embodiments of the present disclosure.

Alternative Embodiment One: An Uplink Resource is Semi-Persistently Configured for CG1

The DC is performed between CG1 and CG2. A system semi-persistently configures downlink-uplink pattern1 (DL-UL pattern1) and/or an offset in time for a terminal. DL-UL pattern1 and/or the offset in time indicates to the terminal which time units are available uplink time units of CG1, that is, the terminal may send uplink transmissions on CG1 over these time units.

The base station dynamically schedules or semi-persistently configures that the terminal sends uplink transmission 1 (UT1) on CG1.

If the terminal does not need to send any uplink transmission on CG2 over a time domain resource corresponding to uplink transmission UT1 according to the semi-persistent configuration and/or scheduling of the base station, the terminal sends uplink transmission UT1 on CG1 according to the semi-persistent configuration or scheduling of the base station.

If the terminal needs to send uplink transmission UT2 on CG2 over time domain resource T1 corresponding to uplink transmission UT1 according to the semi-persistent configuration and/or scheduling of the base station, and time domain resource T2 corresponding to UT2 completely or partially overlaps time domain resource T1 corresponding to UT1, the terminal needs to determine the priority of uplink transmission UT1 and the priority of uplink transmission UT2 according to the following principles: if time domain resource T1 belongs to a subset of the available uplink time units of CG1 configured by DL-UL pattern1 and/or the offset in time, uplink transmission UT1 has a higher priority than uplink transmission UT2; if time domain resource T1 does not belong to the available uplink time units of CG1 configured by DL-UL pattern) and/or the offset in time and may be an available downlink time unit, or a time unit with an uncertain transmission direction, or an unavailable uplink time unit of CG1 configured by DL-UL pattern1 and/or the offset in time, the following cases are included.

Case 1: uplink transmission UT1 has a lower priority than uplink transmission UT2.

Case 2: the prioritization of UT1 and UT2 is not specified but determined by the terminal according to the implementation of the terminal itself.

Case 3: the base station may semi-persistently or persistently configure whether UT1 has a higher priority than UT2 or UT2 has a higher priority than UT1 in this case.

Case 4: a determination needs to be made according to specific transmission types of UT1 and UT2. The transmission type includes at least one of the followings: a PUCCH, a PUSCH, a PUSCH for multiplexing certain UCI, a PUSCH without multiplexing UCI, a PUCCH containing certain UCI, a PRACH, an SRS, a DMRS, a URLLC PUCCH, a URLLC PUSCH, a URLLC PRACH, a URLLC SRS, a URLLC DMRS, an eMBB PUCCH, an eMBB PUSCH, an eMBB PRACH, an eMBB SRS, an eMBB DMRS or the like. A set of rules is predefined by the system or semi-persistently configured by the base station for the terminal. The rules indicate whether UT1 has a higher priority than UT2 or UT2 has a higher priority than UT1 when UT1 is channel type 1 and UT2 is channel type 2. Channel type 1 and channel type 2 each are one of channel types and may be the same or different.

The terminal prioritizes an uplink transmission with a high priority, and an uplink transmission with a low priority may be sent with reduced power or canceled. For example, if it is determined according to the preceding principles that UT1 on CG1 has a higher priority than UT2 on CG2, the terminal prioritizes the sending of UT1 on CG1, and the sending of UT2 on CG2 is either performed with reduced transmit power or canceled.

In this embodiment, CG1 is an LTE CG and CG2 is an NR CG; alternatively, CG1 is an NR CG and CG2 is an LTE CG; alternatively, CG1 is an NR CG and CG2 is also an NR CG; alternatively, at least one of CG1 or CG2 is in another system mode. A CG may include one or more carriers.

Alternative Embodiment 1-1: An Uplink Resource is Semi-Persistently Configured for CG1

The DC is performed between CG1 and CG2. A system semi-persistently configures DL-UL pattern1 and/or an offset in time for the terminal. DL-UL pattern1 and/or the offset in time indicates to the terminal which time units are available uplink time units of CG1, that is, the terminal may send uplink transmissions on CG1 over these time units.

The base station semi-persistently configures or dynamically schedules that the terminal sends uplink transmission UT1 on CG1.

If the terminal does not need to send any uplink transmission on CG2 over the time domain resource corresponding to uplink transmission UT1 according to the semi-persistent configuration and/or scheduling of the base station, the terminal sends uplink transmission UT1 on CG1 according to the semi-persistent configuration or scheduling of the base station.

If the terminal needs to send uplink transmission UT2 on CG2 over time domain resource T1 corresponding to uplink transmission UT1 according to the semi-persistent configuration and/or scheduling of the base station, and time domain resource T2 corresponding to UT2 completely or partially overlaps time domain resource T1 corresponding to UT1, the terminal needs to determine according to the principles below whether to send uplink transmission UT1 and uplink transmission UT2.

If time domain resource T1 belongs to a subset of the available uplink time units of CG1 configured by DL-UL pattern1 and/or the offset in time, uplink transmission UT1 is sent, and sending of uplink transmission UT2 is canceled or uplink transmission UT2 is sent with reduced power.

If time domain resource T1 does not belong to the available uplink time units of CG1 configured by DL-UL pattern1 and/or the offset in time and may be an available downlink time unit, or a time unit with an uncertain transmission direction, or an unavailable uplink time unit of CG1 configured by DL-UL pattern1 and/or the offset in time, the following cases are included.

Case 1: uplink transmission UT1 is sent, and the sending of uplink transmission UT2 is canceled or uplink transmission UT2 is sent with reduced power.

Case 2: uplink transmission UT2 is sent, and the sending of uplink transmission UT1 is canceled or uplink transmission UT1 is sent with reduced power.

Case 3: sending of an uplink transmission on an MCG (where the uplink transmission may be UT1 or UT2), and canceling the sending of an uplink transmission on an SCG (where the uplink transmission may be UT2 or UT1) or sending of the uplink transmission on the SCG (where the uplink transmission may be UT2 or UT1) with reduced power are determined according to which one of CG1 or CG2 is the MCG.

Case 4: the terminal determines according to the implementation of the terminal itself whether to send uplink transmission UT1, and whether to cancel the sending of uplink transmission UT2 or whether to send uplink transmission UT2 with reduced power.

Case 5: the base station may semi-persistently or persistently configure whether to send uplink transmission UT1, and/or whether to cancel the sending of uplink transmission UT2, and/or whether to send uplink transmission UT2 with reduced power in this case.

Case 6: a determination needs to be made according to specific transmission types of UT1 and UT2. The transmission type includes at least one of the followings: a PUCCH, a PUSCH, a PUSCH for multiplexing certain UCI, a PUSCH without multiplexing UCI, a PUCCH containing certain UCI, a PRACH, an SRS, a DMRS, a URLLC PUCCH, a URLLC PUSCH, a URLLC PRACH, a URLLC SRS, a URLLC DMRS, an eMBB PUCCH, an eMBB PUSCH, an eMBB PRACH, an eMBB SRS, an eMBB DMRS or the like. A set of rules is predefined by the system or semi-persistently configured by the base station for the terminal. The rules indicate whether to send uplink transmission UT1, and/or whether to cancel the sending of uplink transmission UT2, and/or whether to send uplink transmission UT2 with reduced power when UT1 is channel type 1 and UT2 is channel type 2. Channel type 1 and channel type 2 each are one of channel types and may be the same or different.

In this embodiment, CG1 is an LTE CG and CG2 is an NR CG. A CG may include one or more carriers.

Alternative Embodiment 1-2: An Uplink Resource is Semi-Persistently Configured for CG1

The DC is performed between CG1 and CG2. A system semi-persistently configures DL-UL pattern1 and/or an offset in time for a terminal. DL-UL pattern1 and/or the offset in time indicates to the terminal which time units are available uplink time units of CG1, that is, the terminal may send uplink transmissions on CG1 over these time units.

The base station dynamically schedules or semi-persistently configures that the terminal sends uplink transmission UT1 on CG1.

If the terminal does not need to send any uplink transmission on CG2 over a time domain resource corresponding to uplink transmission UT1 according to the semi-persistent configuration and/or scheduling of the base station, the terminal sends uplink transmission UT1 on CG1 according to the semi-persistent configuration or scheduling of the base station.

If the terminal needs to send uplink transmission UT2 on CG2 over time domain resource T1 corresponding to uplink transmission UT1 according to the semi-persistent configuration and/or scheduling of the base station, and time domain resource T2 corresponding to UT2 completely or partially overlaps time domain resource T1 corresponding to UT1, the terminal needs to determine according to the principles below whether to send uplink transmission UT1 and uplink transmission UT2.

If time domain resource T1 belongs to a subset of the available uplink time units of CG1 configured by DL-UL pattern1 and/or the offset in time, uplink transmission UT1 is sent, and sending of uplink transmission UT2 is canceled or uplink transmission UT2 is sent with reduced power.

If time domain resource T1 does not belong to the available uplink time units of CG1 configured by DL-UL pattern1 and/or the offset in time and may be an available downlink time unit, or a time unit with an uncertain transmission direction, or an unavailable uplink time unit of CG1 configured by DL-UL pattern1 and/or the offset in time, the following cases are included.

Case 1: uplink transmission UT1 is sent, and the sending of uplink transmission UT2 is canceled or uplink transmission UT2 is sent with reduced power.

Case 2: uplink transmission UT2 is sent, and the sending of uplink transmission UT1 is canceled or uplink transmission UT1 is sent with reduced power.

Case 3: sending of an uplink transmission on the MCG (where the uplink transmission may be UT1 or UT2), and canceling the sending of an uplink transmission on the SCG (where the uplink transmission may be UT2 or UT1) or sending of an uplink transmission on the SCG (where the uplink transmission may be UT2 or UT1) with reduced power are determined according to the one of CG1 or CG2 which is the MCG.

Case 4: the terminal determines according to the implementation of the terminal itself whether to send uplink transmission UT1, and whether to cancel the sending of uplink transmission UT2 or whether to send uplink transmission UT2 with reduced power.

Case 5: the base station may semi-persistently or persistently configure whether to send uplink transmission UT1, and/or whether to cancel the sending of uplink transmission UT2, and/or whether to send uplink transmission UT2 with reduced power in this case.

Case 6: a determination needs to be made according to specific transmission types of UT1 and UT2. The transmission type includes at least one of the followings: a PUCCH, a PUSCH, a PUSCH for multiplexing certain UCI, a PUSCH without multiplexing UCI, a PUCCH containing certain UCI, a PRACH, an SRS, a DMRS, a URLLC PUCCH, a URLLC PUSCH, a URLLC PRACH, a URLLC SRS, a URLLC DMRS, an eMBB PUCCH, an eMBB PUSCH, an eMBB PRACH, an eMBB SRS, an eMBB DMRS or the like. A set of rules is predefined by the system or semi-persistently configured by the base station for the terminal. The rules indicate whether to send uplink transmission UT1, and/or whether to cancel the sending of uplink transmission UT2, and/or whether to send uplink transmission UT2 with reduced power when UT1 is channel type 1 and UT2 is channel type 2. Channel type 1 and channel type 2 each are one of channel types and may be the same or different.

In this embodiment, CG1 is an LTE CG and CG2 is an NR CG; alternatively, CG1 is an NR CG and CG2 is an LTE CG; alternatively, CG1 is an NR CG and CG2 is also an NR CG; alternatively, at least one of CG1 or CG2 is in another system mode. A CG may include one or more carriers.

Alternative Embodiment Two: It is Similar to Alternative Embodiment One and in View of Downlink Transmissions The DC is performed between CG1 and CG2. A system semi-persistently configures DL-UL pattern1 and/or an offset in time for a terminal. DL-UL pattern1 and/or the offset in time indicates to the terminal which time units are available downlink time units of CG1, that is, the terminal may receive downlink transmissions on CG1 over these time units.

A base station schedules that the terminal receives one downlink transmission UT1 on CG1.

If the terminal does not need to receive any downlink transmission on CG2 over a time domain resource corresponding to downlink transmission UT1, the terminal receives downlink transmission UT1 on CG1 according to the scheduling of the base station.

If the terminal needs to receive downlink transmission UT2 on CG2 over time domain resource T1 corresponding to downlink transmission UT1, and time domain resource T2 corresponding to UT2 completely or partially overlaps time domain resource T1 corresponding to UT1, the terminal needs to determine the priority of downlink transmission UT1 and the priority of downlink transmission UT2 according to the following principles: if time domain resource T1 belongs to a subset of the available downlink time units of CG1 configured by DL-UL pattern1 and/or the offset in time, downlink transmission UT1 has a higher priority than downlink transmission UT2; and if time domain resource T1 does not belong to the available downlink time units of CG1 configured by DL-UL pattern1 and/or the offset in time and may be an available uplink time unit, or a time unit with an uncertain transmission direction, or an unavailable downlink time unit of CG1 configured by DL-UL pattern1 and/or the offset in time, the following cases are included.

Case 1: downlink transmission UT1 has a lower priority than downlink transmission UT2.

Case 2: the prioritization of UT1 and UT2 is not specified but determined by the terminal according to the implementation of the terminal itself.

Case 3: a mode may be configured. The base station may semi-persistently or persistently configure whether UT1 has a higher priority than UT2 or UT2 has a higher priority than UT1 in this case.

Case 4: a determination needs to be made according to specific transmission channel types of UT1 and UT2. The transmission channel type includes at least one of the followings: a PDCCH, a PDSCH, a PDCCH using a certain downlink control information format size (DCI format size), a channel-state information-reference signal (CSI-RS), a DMRS, a URLLC PDCCH, a URLLC PDSCH, a URLLC PDCCH using a certain DCI format size, a URLLC CSI-RS, a URLLC DMRS, an eMBB PDCCH, an eMBB PDSCH, an eMBB PDCCH using a certain DCI format size, an eMBB CSI-RS, an eMBB DMRS or the like. A set of rules is predefined by the system or semi-persistently configured by the base station for the terminal. The rules indicate whether UT1 has a higher priority than UT2 or UT2 has a higher priority than UT1 when UT1 is of transmission channel type 1 and UT2 is of transmission channel type 2. Transmission channel type 1 and transmission channel type 2 each are one of the above transmission channel types and may be the same or different.

The terminal needs to ensure reception of a downlink transmission with a high priority. For a downlink transmission with a low priority, the terminal cancels reception of the downlink transmission or receives only a part of the downlink transmission. For example, if it is determined according to the preceding principles that UT1 on CG1 has a higher priority than UT2 on CG2, the terminal receives UT1 on CG1, and for UT2 on CG2, the terminal either cancels the reception or receive only the part of the transmission where CG2 does not overlap CG1.

In this embodiment, CG1 and CG2 may both be an LTE CG, an NR CG, or a CG supporting other radio technologies. A CG may include one or more carriers.

Alternative Embodiment 2-1

The DC is performed between CG1 and CG2. A system semi-persistently configures DL-UL pattern1 and/or an offset in time for a terminal. DL-UL pattern1 and/or the offset in time indicates to the terminal which time units are available downlink time units of CG1, that is, the terminal may receive downlink transmissions on CG1 over these time units.

The base station schedules that the terminal receives one downlink transmission UT1 on CG1.

If the terminal does not need to receive any downlink transmission on CG2 over a time domain resource corresponding to downlink transmission UT1, the terminal receives downlink transmission UT1 on CG1 according to the scheduling of the base station.

If the terminal needs to receive downlink transmission UT2 on CG2 over time domain resource T1 corresponding to downlink transmission UT1, and time domain resource T2 corresponding to UT2 completely or partially overlaps time domain resource T1 corresponding to UT1, the terminal needs to determine according to the principles below whether to receive downlink transmission UT1 and downlink transmission UT2.

If time domain resource T1 belongs to a subset of the available downlink time units of CG1 configured by DL-UL pattern1 and/or the offset in time, the terminal receives downlink transmission UT1 and cancels the reception of downlink transmission UT2.

If time domain resource T1 does not belong to the available downlink time units of CG1 configured by DL-UL pattern1 and/or the offset in time and may be an available uplink time unit, or a time unit with an uncertain transmission direction, or an unavailable downlink time unit of CG1 configured by DL-UL pattern1 and/or the offset in time, the following cases are included.

Case 1: the terminal receives downlink transmission UT2, and the reception of downlink transmission UT1 is canceled or downlink transmission UT1 is received over a part of time domain resources where downlink transmission UT1 does not overlap UT2.

Case 2: the terminal receives downlink transmission UT1, and the reception of downlink transmission UT2 is canceled or downlink transmission UT2 is received over a part of time domain resources where downlink transmission UT2 does not overlap UT1.

Case 3: it is determined according to which one of CG1 or CG2 is the MCG that the terminal receives a downlink transmission on the MCG (where the downlink transmission may be UT1 or UT2), and that reception of a downlink transmission on the SCG (where the downlink transmission may be UT2 or UT1) is canceled or a downlink transmission on the SCG (where the downlink transmission may be UT2 or UT1) is received over a part of time domain resources.

Case 4: the terminal determines according to the implementation of the terminal itself whether to receive downlink transmission UT1 and downlink transmission UT2.

Case 5: a mode may be configured. The base station may semi-persistently or persistently configure whether the terminal receives downlink transmission UT1 or downlink transmission UT2 in this case.

Case 6: a determination needs to be made according to specific transmission channel types of UT1 and UT2. The transmission channel type includes at least one of the followings: a PDCCH, a PDSCH, a PDCCH using a certain DCI format size, a CSI-RS, a DMRS, a URLLC PDCCH, a URLLC PDSCH, a URLLC PDCCH using a certain DCI format size, a URLLC CSI-RS, a URLLC DMRS, an eMBB PDCCH, an eMBB PDSCH, an eMBB PDCCH using a certain DCI format size, an eMBB CSI-RS, an eMBB DMRS or the like. A set of rules is predefined by the system or semi-persistently configured by the base station for the terminal. The rules indicate whether the terminal receives downlink transmission UT1 or downlink transmission UT2 when UT1 is of transmission channel type 1 and UT2 is of transmission channel type 2. Transmission channel type 1 and transmission channel type 2 each are one of the above transmission channel types and may be the same or different.

In this embodiment, CG1 is an LTE CG and CG2 is an NR CG. A CG may include one or more carriers.

Alternative Embodiment 2-2

The DC is performed between CG1 and CG2. A system semi-persistently configures DL-UL pattern1 and/or an offset in time for a terminal. DL-UL pattern1 and/or the offset in time indicates to the terminal which time units are available downlink time units of CG1, that is, the terminal may receive downlink transmissions on CG1 over these time units.

A base station schedules that the terminal receives one downlink transmission UT1 on CG1.

If the terminal does not need to receive any downlink transmission on CG2 over a time domain resource corresponding to downlink transmission UT1, the terminal receives downlink transmission UT1 on CG1 according to the scheduling of the base station.

If the terminal needs to receive downlink transmission UT2 on CG2 over time domain resource T1 corresponding to downlink transmission UT1, and time domain resource T2 corresponding to UT2 completely or partially overlaps time domain resource T1 corresponding to UT1, the terminal needs to determine according to the principles below whether to receive downlink transmission UT1 and downlink transmission UT2.

If time domain resource T1 belongs to a subset of the available downlink time units of CG1 configured by DL-UL pattern1 and/or the offset in time, the terminal receives downlink transmission UT1, and the reception of downlink transmission UT2 is canceled.

If time domain resource T1 does not belong to the available downlink time units of CG1 configured by DL-UL pattern1 and/or the offset in time and may be an available uplink time unit, or a time unit with an uncertain transmission direction, or an unavailable downlink time unit of CG1 configured by DL-UL pattern1 and/or the offset in time, the following cases are included.

- Case 1: the terminal receives downlink transmission UT2, and the reception of downlink transmission UT1 is canceled or downlink transmission UT1 is received over a part of time domain resources where downlink transmission UT1 does not overlap UT2.
- Case 2: the terminal receives downlink transmission UT1, and the reception of downlink transmission UT2 is canceled or downlink transmission UT2 is received over a part of time domain resources where downlink transmission UT2 does not overlap UT1.
- Case 3: it is determined according to which one of CG1 or CG2 is the MCG that the terminal receives a downlink transmission on the MCG (where the downlink transmission may be UT1 or UT2), and that the reception of a downlink transmission on the SCG (where the downlink transmission may be UT2 or UT1) is canceled or the downlink transmission on the SCG (where the downlink transmission may be UT2 or UT1) is received over a part of time domain resources.
- Case 4: the terminal determines according to the implementation of the terminal itself whether to receive downlink transmission UT1 and downlink transmission UT2.
- Case 5: a mode may be configured. The base station may semi-persistently or persistently configure whether the terminal receives downlink transmission UT1 or downlink transmission UT2 in this case.
- Case 6: a determination needs to be made according to specific transmission channel types of UT1 and UT2. The transmission channel type includes at least one of the followings: a PDCCH, a PDSCH, a PDCCH using a certain DCI format size, a CSI-RS, a DMRS, a URLLC PDCCH, a URLLC PDSCH, a URLLC PDCCH using a certain DCI format size, a URLLC CSI-RS, a URLLC DMRS, an eMBB PDCCH, an eMBB PDSCH, an eMBB PDCCH using a certain DCI format size, an eMBB CSI-RS, an eMBB DMRS or the like. A set of rules is predefined by the system or semi-persistently configured by the base station for the terminal. The rules indicate whether the terminal receives downlink transmission UT1 or downlink transmission UT2 when UT1 is of transmission channel type 1 and UT2 is of transmission channel type 2. Transmission channel type 1 and transmission channel type 2 each are one of the above transmission channel types and may be the same or different.

In this embodiment, CG1 and CG2 may both be an LTE CG, an NR CG, or a CG supporting other radio technologies. A CG may include one or more carriers.

Alternative Embodiment Three: Whether a Conflict Between a Transmission Scheduled or Semi-Persistently Configured on a CG and the Transmission Direction Configuration of the CG is Allowed Depends on a UE Type A terminal reports power allocation capabilities of the terminal for multiple CGs to a base station, such as capability one and capability one. According to the capabilities reported by terminals, the terminals are classified into different types. For example, a terminal supporting capability one is classified as a type-one terminal, and a terminal supporting capability two is classified as a type-two terminal. According to different types of terminals, it is determined whether the base station may schedule the terminal to send an uplink transmission over a specific time unit.

The base station semi-persistently configures DL-UL pattern1 and/or an offset in time for the terminal. DL-UL pattern1 and/or the offset in time indicates to the terminal which time units are available uplink time units of CG1, that is, the terminal may send uplink transmissions on CG1 over these time units.

The examples are described below.

For a terminal of capability type one, the transmission time for sending an uplink transmission on CG1 by such a terminal is semi-persistently configured or scheduled by the base station and needs to be a subset of the available uplink time units of CG1 configured by DL-UL pattern1 and/or the offset in time. For a time unit that is not configured by DL-UL pattern1 and/or the offset in time as an available uplink time unit of CG1, the base station does not schedule the terminal to send an uplink transmission on CG1 over this time unit; and similarly, the terminal does not regard that the base station schedules this time unit to the terminal for the terminal to send an uplink transmission on CG1 over the time unit.

For a terminal of capability type two, the transmission time for sending an uplink transmission on CG1 by such a terminal is semi-persistently configured or scheduled by the base station and may be in an arbitrary time unit; and similarly, the terminal also regards that the base station may schedule the terminal to send an uplink transmission on CG1 over an arbitrary time unit.

In this embodiment, CG1 and CG2 may both be an LTE CG, an NR CG, or a CG supporting other radio technologies. A CG may include one or more carriers.

Alternative Embodiment Four: In View of Both CG1 and CG2, a Set of Priority Patterns is Configured A base station configures one or more sets of time domain patterns for a terminal. Each set of time domain patterns indicates over several consecutive or inconsecutive time units, which CG has a higher uplink transmission priority or which set of uplink transmission power thresholds is applied.

As shown in FIG. 3, shaded parts indicate that CG1 has a higher priority than CG2, and non-shaded parts indicate that CG2 has a higher priority than CG1. The base station may semi-persistently configure the one or more sets of time domain patterns for the terminal through high layer signaling. According to a received time domain pattern, the terminal may know to prioritize the sending of the transmission on which CG when an overlapping uplink transmission in time domain exists between CG1 and CG2, the terminal prioritizes an uplink transmission on a CG with a high priority; and for an uplink transmission on a CG with a low priority, if the terminal power is limited, the sending may be canceled or performed with reduced power.

Figure 4:
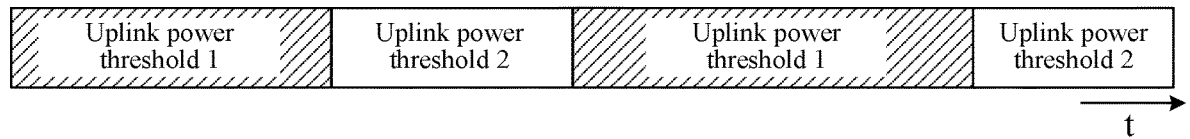
FIG. 4 is a schematic diagram of a pattern of uplink power thresholds according to alternative embodiments four and five of the present disclosure.

Alternatively, as shown in FIG. 4, the base station configures or equivalently configures two sets of uplink transmission power thresholds for the terminal. According to a received time domain pattern, the terminal may know which set of uplink transmission power thresholds is applied to which time units. Equivalent configuration of two sets of uplink transmission power thresholds refers to that the base station merely configures one set of uplink transmission power thresholds, and the terminal may calculate the second set of uplink transmission power thresholds according to the one set of thresholds and the maximum power upper limit. For example, the base station configures the uplink sending power threshold as 40%, the terminal may calculate the other set of uplink transmission power thresholds as 1-40%, that is, 60%.

In this embodiment, the time domain pattern may be extra-configured high layer signaling, or may also be a transmission direction indication for a certain CG which is configured by the base station for the terminal. When the time domain patter is the latter, the terminal may regard that in a time domain unit where the transmission direction indication is configured to be an uplink transmission direction or a flexible direction, an uplink transmission on this CG has a higher priority than other CGs; and that in a time domain unit where the transmission direction indication is a downlink transmission direction or a flexible direction, uplink transmissions on other CGs have a higher priority than this CG. This CG refers to a CG corresponding to the transmission direction indication.

A CG may include one or more carriers.

Alternative Embodiment Five: It is Similar to Alternative Embodiment Four and in View of Downlink Transmissions A base station configures one or more sets of time domain patterns for a terminal. Each set of time domain patterns indicates a downlink transmission on which CG has a high priority over consecutive or inconsecutive time units. For example, as shown in FIG. 3, shaded parts indicate that CG1 has a higher priority than CG2, and non-shaded parts indicate that CG2 has a higher priority than CG1. The base station may semi-persistently configure the one or more sets of time domain patterns for the terminal through high layer signaling.

According to a received time domain pattern, the terminal may know to prioritize reception of a downlink transmission on which CG when an overlapping downlink transmission in time domain exists between CG1 and CG2, the terminal prioritizes reception of a downlink transmission on a CG with a high priority; and for a downlink transmission on a CG with a low priority, the terminal cancels the reception or receive the downlink transmission merely over a part of transmission resources.

In this embodiment, the time domain pattern may be extra-configured high layer signaling or a transmission direction indication for a certain CG which is configured by the base station for the terminal. When the time domain patter is the latter, the terminal may regard that in a time domain unit where the transmission direction indication is configured to be a downlink transmission direction or a flexible direction, a downlink transmission on this CG has a higher priority than other CGs; and that in a time domain unit where the transmission direction indication is an uplink transmission direction or a flexible direction, downlink transmissions on other CGs have a higher priority than this CG. This CG refers to a CG corresponding to the transmission direction indication.

A CG may include one or more carriers.

Embodiment Three

An embodiment of the present disclosure further provides a storage medium. The storage medium includes a stored program. When the stored program is executed, any one of the preceding methods is performed.

Alternatively, in this embodiment, the storage medium may be configured to store program codes for performing the steps below.

In S1, a first transmission sent on a first carrier or a first carrier group is scheduled, and a second transmission sent on a second carrier or a second carrier group is scheduled. Transmission time of the first transmission overlaps transmission time of the second transmission. If a transmission direction configuration of the first carrier or the first carrier group indicates that an uplink transmission is able to be sent within the transmission time of the first transmission, a terminal sends the first transmission, and the sending of the second transmission is canceled or the second transmission is sent with reduced power; and/or if a transmission direction configuration of the first carrier or the first carrier group does not indicate that an uplink transmission is able to be sent within the transmission time of the first transmission, a terminal performs at least one of the following modes: 1) sending the first transmission, and canceling the sending of the second transmission or sending the second transmission with reduced power; 2) sending the second transmission, and canceling the sending of the first transmission or sending the first transmission with reduced power; 3) determining whether to send the first transmission or the second transmission by the terminal itself; 4) determining whether to send the first transmission or the second transmission according to high layer signaling 1 configured by a base station; or 5) determining whether to send the first transmission or the second transmission according to a transmission type of the first transmission, a transmission type of the second transmission, and rule 1 configured by a base station.

Alternatively, in this embodiment, the storage medium may include, but is not limited to, a USB flash disk, a read-only memory (ROM), a random access memory (RAM), a mobile hard disk, a magnetic disk, an optical disk or another medium capable of storing program codes.

Alternatively, for the examples in this embodiment, reference may be made to the examples described in the embodiments and alternative implementations above. Details are not repeated here.

Each of the modules or steps in the embodiments above may be implemented by a universal computing apparatus. The modules or steps may be concentrated on a single computing apparatus or distributed on a network composed of multiple computing apparatuses. Alternatively, the modules or steps may be implemented by program codes executable by the computing apparatus so that the modules or steps may be stored in a storage apparatus and executed by the computing apparatus. Moreover, in some cases, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

What is claimed is:

1. A channel or signal sending method, being applied to a dual connection scenario or a carrier aggregation scenario and comprising:
   scheduling a first transmission sent on a first carrier or a first carrier group (CG), and scheduling a second transmission sent on a second carrier or a second carrier group; wherein transmission time of the first transmission overlaps transmission time of the second transmission;
   in a case where a transmission direction configuration of the first carrier or the first carrier group indicates that an uplink transmission is sent within the transmission time of the first transmission, sending, by a terminal, the first transmission, and canceling sending of the second transmission or sending the second transmission with reduced power; or
   in a case where a transmission direction configuration of the first carrier or the first carrier group does not indicate that an uplink transmission is sent within the transmission time of the first transmission, performing, by a terminal, at least one of the following modes:
      sending the first transmission, and canceling sending of the second transmission or sending the second transmission with reduced power;
      sending the second transmission, and canceling sending of the first transmission or sending the first transmission with reduced power;
      determining, by the terminal, whether to send the first transmission or the second transmission;
      determining, according to higher layer signaling configured by a base station, whether to send the first transmission or the second transmission; or
      determining, according to a transmission type of the first transmission, a transmission type of the second transmission, and rule 1 configured by a base station, whether to send the first transmission or the second transmission;
   wherein the method further comprises: determining, by the terminal, a priority of a transmission channel or signal according to at least one of the following pieces of information:
      transmission time of the transmission channel or signal;
      a transmission direction configuration of a CG;
      whether a CG where the transmission channel or signal is located is a main carrier group (MCG) or a secondary carrier group (SCG);
      whether a CG where the transmission channel or signal is located is LTE or NR;
      a terminal capability type;
      a time domain pattern of a transmission priority;
      a time domain pattern of an uplink power threshold;
      a transmission type of the transmission channel or signal;
      a terminal implementation mode; or
      a determination rule configured by a base station.

2. The method of claim 1, wherein the higher layer signaling is used for the base station to instruct the terminal to perform at least one of:
   sending the first transmission, and canceling sending of the second transmission;
   sending the second transmission, and canceling sending of the first transmission;
   sending the first transmission, and sending the second transmission with reduced power; or
   sending the second transmission, and sending the first transmission with reduced power.

3. The method of claim 2, further comprising at least one of:
   sending, by the terminal, an uplink transmission with a high priority, or receiving a downlink transmission with a high priority;
   canceling, by the terminal, sending of an uplink transmission with a low priority, or sending an uplink transmission with a low priority with reduced power; or
   canceling, by the terminal, reception of a downlink transmission with a low priority, or receiving, by the terminal, a downlink transmission with a low priority over a part of time-frequency resources of the transmission.

4. The method of claim 1, wherein the rule 1 is used for instructing the terminal to perform at least one of the following operations in a case where a base station configures for the terminal that the first transmission is of transmission type 1 and the second transmission is of transmission type 2:
   sending the first transmission, and canceling sending of the second transmission;
   sending the second transmission, and canceling sending of the first transmission; sending the first transmission, and sending the second transmission with reducing power; or
   sending the second transmission, and sending the first transmission with reduced power.

5. The method of claim 4, further comprising at least one of:
   sending, by the terminal, an uplink transmission with a high priority, or receiving a downlink transmission with a high priority;
   canceling, by the terminal, sending of an uplink transmission with a low priority, or sending an uplink transmission with a low priority with reduced power; or
   canceling, by the terminal, reception of a downlink transmission with a low priority, or receiving, by the terminal, a downlink transmission with a low priority over a part of time-frequency resources of the transmission.

6. The method of claim 1, wherein the transmission type comprises at least one of: a physical uplink control channel (PUCCH), a physical uplink shared channel (PUSCH), a PUSCH multiplexing designated uplink control information (UCI), a PUSCH without multiplexing UCI, a PUCCH containing designated UCI, a physical random access channel (PRACH), a sounding reference signal (SRS), a demodulation reference signal (DMRS), an ultra reliable and low latency communication (URLLC) PUCCH, a URLLC PUSCH, a URLLC PRACH, a URLLC SRS, a URLLC DMRS, an enhanced mobile broadband (eMBB) PUCCH, an eMBB PUSCH, an eMBB PRACH, an eMBB SRS or an eMBB DMRS.

7. The method of claim 6, further comprising at least one of:
   sending, by the terminal, an uplink transmission with a high priority, or receiving a downlink transmission with a high priority;
   canceling, by the terminal, sending of an uplink transmission with a low priority, or sending an uplink transmission with a low priority with reduced power; or
   canceling, by the terminal, reception of a downlink transmission with a low priority, or receiving, by the terminal, a downlink transmission with a low priority over a part of time-frequency resources of the transmission.

8. The method of claim 1, wherein the first carrier is a long term evolution (LTE) carrier or the first carrier group is an LTE carrier group; and the second carrier is a new radio (NR) carrier or the second carrier group is an NR carrier group.

9. The method of claim 8, further comprising at least one of:
   sending, by the terminal, an uplink transmission with a high priority, or receiving a downlink transmission with a high priority;
   canceling, by the terminal, sending of an uplink transmission with a low priority, or sending an uplink transmission with a low priority with reduced power; or
   canceling, by the terminal, reception of a downlink transmission with a low priority, or receiving, by the terminal, a downlink transmission with a low priority over a part of time-frequency resources of the transmission.

10. The method of claim 1, further comprising at least one of:
    sending, by the terminal, an uplink transmission with a high priority, or receiving a downlink transmission with a high priority;
    canceling, by the terminal, sending of an uplink transmission with a low priority, or sending an uplink transmission with a low priority with reduced power; or
    canceling, by the terminal, reception of a downlink transmission with a low priority, or receiving, by the terminal, a downlink transmission with a low priority over a part of time-frequency resources of the transmission.

11. The method of claim 1, further comprising:
    for a terminal not supporting dynamic power allocation, regarding by default, by the terminal, the transmission time of the first transmission scheduled by a base station as a subset of time units in which the transmission direction configuration of the first carrier or the first carrier group is uplink.

12. The method of claim 1, further comprising:
    for a terminal capable of supporting dynamic power allocation, regarding, by the terminal, the transmission time of the first transmission scheduled by a base station as an arbitrary time unit by default.

13. The method of claim 1, further comprising:
    receiving, by the terminal, a time domain pattern of a transmission priority semi-persistently configured by a base station through higher layer signaling; wherein the time domain pattern of the transmission priority is used for indicating a prioritization of a plurality of carriers or carrier groups in a plurality of consecutive or inconsecutive time units; and
    acquiring, by the terminal, a prioritization of carriers or carrier groups in at least one time unit according to the received time domain pattern of the transmission priority.

14. The method of claim 1, further comprising:
    receiving, by the terminal, a time domain pattern of an uplink power threshold semi-persistently configured by a base station through higher layer signaling; wherein the time domain pattern of the uplink power threshold is used for indicating a set of uplink power thresholds applied by the terminal to each of a plurality of consecutive or inconsecutive time units.

15. A non-transitory storage medium storing a computer program, wherein
    when the computer program is executed to implement the following:
    scheduling a first transmission sent on a first carrier or a first carrier group (CG), and scheduling a second transmission sent on a second carrier or a second carrier group; wherein transmission time of the first transmission overlaps transmission time of the second transmission;
    in a case where a transmission direction configuration of the first carrier or the first carrier group indicates that an uplink transmission is sent within the transmission time of the first transmission, sending the first transmission, and canceling sending of the second transmission or sending the second transmission with reduced power; or
    in a case where a transmission direction configuration of the first carrier or the first carrier group does not indicate that an uplink transmission is sent within the transmission time of the first transmission, performing at least one of the following modes:
       sending the first transmission, and canceling sending of the second transmission or sending the second transmission with reduced power;
       sending the second transmission, and canceling sending of the first transmission or sending the first transmission with reduced power;
       determining whether to send the first transmission or the second transmission;
       determining, according to higher layer signaling configured by a base station, whether to send the first transmission or the second transmission; or
       determining, according to a transmission type of the first transmission, a transmission type of the second transmission, and rule 1 configured by a base station, whether to send the first transmission or the second transmission;
    wherein the computer program is executed to further implement determining a priority of a transmission channel or signal according to at least one of the following pieces of information:
       transmission time of the transmission channel or signal;
       a transmission direction configuration of a CG;
       whether a CG where the transmission channel or signal is located is a main carrier group (MCG) or a secondary carrier group (SCG);
       whether a CG where the transmission channel or signal is located is LTE or NR;
       a terminal capability type;
       a time domain pattern of a transmission priority;
       a time domain pattern of an uplink power threshold;
       a transmission type of the transmission channel or signal;
       a terminal implementation mode; or
       a determination rule configured by a base station.

16. The storage medium of claim 15, wherein the higher layer signaling is used for the base station to instruct the terminal to perform at least one of:
    sending the first transmission, and canceling sending of the second transmission;
    sending the second transmission, and canceling sending of the first transmission;
    sending the first transmission, and sending the second transmission with reduced power; or
    sending the second transmission, and sending the first transmission with reduced power.

17. The storage medium of claim 15, wherein the rule 1 is used for instructing the terminal to perform at least one of the following operations in a case where a base station configures for the terminal that the first transmission is of transmission type 1 and the second transmission is of transmission type 2:

sending the first transmission, and canceling sending of the second transmission;

sending the second transmission, and canceling sending of the first transmission; sending the first transmission, and sending the second transmission with reducing power; or sending the second transmission, and sending the first transmission with reduced power.

18. The storage medium of claim 15, wherein the transmission type comprises at least one of: a physical uplink control channel (PUCCH), a physical uplink shared channel (PUSCH), a PUSCH multiplexing designated uplink control information (UCI), a PUSCH without multiplexing UCI, a PUCCH containing designated UCI, a physical random access channel (PRACH), a sounding reference signal (SRS), a demodulation reference signal (DMRS), an ultra reliable and low latency communication (URLLC) PUCCH, a URLLC PUSCH, a URLLC PRACH, a URLLC SRS, a URLLC DMRS, an enhanced mobile broadband (eMBB) PUCCH, an eMBB PUSCH, an eMBB PRACH, an eMBB SRS or an eMBB DMRS.

19. The storage medium of claim 15, wherein the first carrier is a long term evolution (LTE) carrier or the first carrier group is an LTE carrier group; and the second carrier is a new radio (NR) carrier or the second carrier group is an NR carrier group.

20. The storage medium of claim 15, wherein the computer program is executed to further implement at least one of the following:

sending an uplink transmission with a high priority, or receiving a downlink transmission with a high priority;

canceling sending of an uplink transmission with a low priority, or sending an uplink transmission with a low priority with reduced power; or canceling reception of a downlink transmission with a low priority, or receiving a downlink transmission with a low priority over a part of time-frequency resources of the transmission.

* * * * *